(12) United States Patent
Maini et al.

(10) Patent No.: US 8,612,076 B2
(45) Date of Patent: Dec. 17, 2013

(54) ANTILOCK BRAKING FOR VEHICLES

(75) Inventors: Chetan Kumar Maini, Bangalore (IN); Prakash Ramaraju, Bangalore (IN); Suresh Veerabetappa Munirangiah, Bangalore (IN); Basab Paul, Bangalore (IN); Sajith Abdul Hameed, Bangalore (IN)

(73) Assignee: Mahindra Reva Electric Vehicles Pvt. Ltd., Bangalore (IN)

( * ) Notice: Subject to any disclaimer, the term of this patent is extended or adjusted under 35 U.S.C. 154(b) by 191 days.

(21) Appl. No.: 13/123,732

(22) PCT Filed: Oct. 14, 2009

(86) PCT No.: PCT/IN2009/000579
§ 371 (c)(1),
(2), (4) Date: Apr. 12, 2011

(87) PCT Pub. No.: WO2010/049945
PCT Pub. Date: May 6, 2010

(65) Prior Publication Data
US 2011/0196560 A1   Aug. 11, 2011

(30) Foreign Application Priority Data

Oct. 31, 2008   (IN) .......................... 2648/CHE/2008
Oct. 15, 2009   (WO) ................. PCT/IN2009/000579

(51) Int. Cl.
*B60L 9/00*      (2006.01)
*B60G 17/016*    (2006.01)
*B60T 13/74*     (2006.01)
*B60T 8/64*      (2006.01)
*B60T 11/00*     (2006.01)

(52) U.S. Cl.
USPC ................... 701/22; 701/38; 303/3; 303/152; 188/350

(58) Field of Classification Search
USPC .......................................... 701/22; 303/152, 3
See application file for complete search history.

(56) References Cited

U.S. PATENT DOCUMENTS

| | | | |
|---|---|---|---|
| 4,962,969 A | | 10/1990 | Davis |
| 5,294,191 A | * | 3/1994 | Giorgetti et al. .................. 303/3 |
| 5,378,053 A | | 1/1995 | Patient et al. |
| 5,476,310 A | * | 12/1995 | Ohtsu et al. ........................ 303/3 |
| 5,549,371 A | * | 8/1996 | Konaga et al. ................ 303/152 |
| 5,632,534 A | * | 5/1997 | Knechtges .................... 303/152 |
| 6,122,587 A | * | 9/2000 | Takahara et al. ................. 701/78 |
| 6,488,344 B2 | * | 12/2002 | Huls et al. ..................... 303/152 |
| 6,709,075 B1 | * | 3/2004 | Crombez et al. .............. 303/152 |
| 7,198,336 B2 | * | 4/2007 | Yamamoto et al. ........... 303/157 |
| 7,281,770 B1 | | 10/2007 | Curran et al. |
| 2005/0127750 A1 | | 6/2005 | Fuhrer et al. |
| 2007/0046099 A1 | * | 3/2007 | Matsuura et al. ............. 303/152 |
| 2008/0100132 A1 | | 5/2008 | Jeon et al. |

FOREIGN PATENT DOCUMENTS

EP   0361708 A2   4/1990

* cited by examiner

*Primary Examiner* — Thomas Black
*Assistant Examiner* — Tyler Paige
(74) *Attorney, Agent, or Firm* — Rahman LLC

(57) ABSTRACT

The invention provides a method and a system for enabling antilock braking in a vehicle which is propelled at least by an electric motor. The method includes detecting tendency of locking of the at least one wheel by comparing actual rate of change of speed of the at least one of the motor, wheels, transmission, shaft and ground speed with expected rate of change of speed of at least one wheel, wherein the vehicle is being decelerated. Based on the tendency of locking at least regenerative braking is modulated to prevent locking of at least one wheel of the vehicle.

9 Claims, 5 Drawing Sheets

ANTILOCK BRAKING FOR VEHICLES

BACKGROUND

The invention generally relates to a vehicle comprising an electric propulsion system. More specifically, the invention relates to a method and system for decelerating the vehicle comprising an electric propelling.

Generally, vehicles have mechanical brakes or hydraulic brakes which are used to decelerate the vehicle. However, in case of vehicles which have an electric propulsion system such as electric or hybrid vehicle, the vehicle is decelerated using an electric motor which is a propelling system of the vehicle, in addition to using mechanical or hydraulic brakes present in the vehicle. Usage of electric motor to decelerate the vehicle is known in the art, and the same is generally known as regenerative braking.

Braking being one of the most crucial safety features of a vehicle, research is being performed to overcome problems relating to braking of vehicles. A common problem relating to braking is locking of the wheels of the vehicles when the brake pedal of the vehicle is pressed. Hence, one aspect of research is to determine locking of the wheels. Generally, locking of the wheels occurs when the vehicle has to be brought to a halt in a relatively less amount of time (sudden braking). Such locking of the wheels is determined by monitoring the speed of the wheels, by using sensors provided at one or more wheels of the vehicle. Providing sensors for monitoring the speed of the wheels may be expensive. A second aspect of research in the field of braking of vehicles is, ensuring anti-locking of the wheels. Such systems are known as Anti-lock Braking Systems (ABS).

Generally in an ABS for electrically propelled vehicles, when locking of one or more wheels of the vehicle is determined, the ABS enables anti-locking of the wheels by controlling the mechanical or hydraulic brakes present in the vehicle and the regenerative braking is not used at all when locking of the wheels is determined.

In light of the foregoing discussion, there is a need for an invention which determines locking of the wheels effectively and in a cost efficient manner. Further, the invention should enable anti-locking of the wheels using regenerative braking.

SUMMARY

An object of the invention is to determine locking of the wheels of a vehicle effectively and in a cost efficient manner, while the vehicle is being decelerated.

Another object of the invention is to enable anti-locking of the wheels using regenerative braking.

In view of the foregoing, an embodiment herein provides a method for enabling antilock braking in a vehicle which is propelled at least by an electric motor. The method includes monitoring the speed of at least one wheel of the vehicle by monitoring speed of at least one of the motor, at least one wheel, transmission, shaft and ground speed. Further, tendency of locking of the at least one wheel is detected by comparing actual rate of change of speed of the at least one of the motor, at least one wheels, transmission, shaft and ground speed with expected rate of change of speed of at least one wheel, wherein the vehicle is being decelerated. If the comparison indicates that there is a tendency of locking of the at least one wheel, then at least regenerative braking is modulated to prevent locking of at least one wheel of the vehicle. Regenerative braking is modulated by momentarily withdrawing regenerative braking to allow the motor and the wheels to rotate when the tendency of locking of the wheels is detected. Further, regenerative braking is dynamically increased when there is no tendency of locking of the wheels and regenerative braking is decreased when there is a tendency of locking of the wheels. In addition to modulating regenerative braking, mechanical or hydraulic brakes present in the vehicle are also modulated.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following description with reference to the drawings, in which.

DETAILED DESCRIPTION OF THE INVENTION

Figure 1:
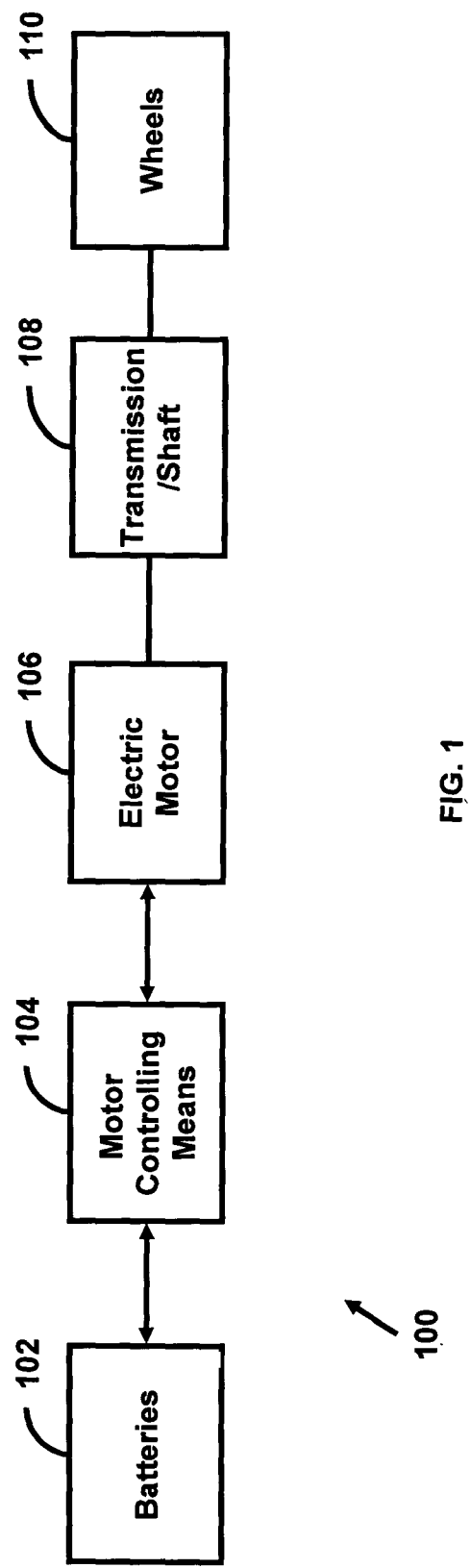
FIG. 1 illustrates a system 100 present in an electrically propelled vehicle, in accordance with various embodiments of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an invention which determines locking of at least one wheel of a vehicle, effectively and in a cost efficient manner. Further, the invention should enable anti-locking of at least one wheel using regenerative braking. The embodiments herein achieve this by providing a novel method and system. Referring now to the drawings, and more particularly to FIGS. 1 through 5, where similar reference characters denote corresponding features consistently throughout the figures, there are shown preferred embodiments.

FIG. 1 illustrates a system 100 present in an electrically propelled vehicle, in accordance with various embodiments of the present invention. System 100 is present in a vehicle such as Electric Vehicles (EV) and hybrid vehicles which are propelled at least by an electric motor. System 100 comprises batteries 102, Motor Controller Module (MCM) 104, electric motor 106, transmission/shaft 108 and wheels 110. MCM 104 is configured to regulate the current provided to the electric motor 106 by batteries 102. The torque produced by the electric motor 106 is transferred to wheels 110 of the vehicle either directly through a shaft 108 or through transmission 108. The electric motor 106 may be a three phase induction motor or any drive motor known in the art. In an embodiment of the invention, batteries 102 supply DC electric power to the electric motor 106. The electric power supplied to the electric motor 106 by the batteries 102 is regulated by MCM 104.

MCM 104 regulates the electric power supplied by the batteries 102 based on various parameters. In an embodiment of the invention, the various parameters MCM 104 considers to regulate electric power are, existing road load, speed of the vehicle, throttle command by the user, braking command by the user, power flow and direction, and speed of the electric motor 106. Further, during braking, MCM 104 is capable of diverting the energy available through the already running electric motor 106 into electrical energy and feed it back to the batteries 102, thus, decelerating the vehicle. This process is called regenerative braking. The rate at which energy from the electric motor 106 can be drawn back by MCM 104 is a settable parameter in MCM 104. This rate is directly proportional to the brake applied. This braking effort by regenerative braking is supplemented by an additional mechanical or hydraulic brakes present in the vehicle. MCM 104 regulates regenerative braking based on the condition of at least one of the wheels 110 of the vehicle, in addition to other parameters, such as existing road load, speed of the vehicle, throttle command by the user, braking command by the user, and power flow and direction.

Figure 2:
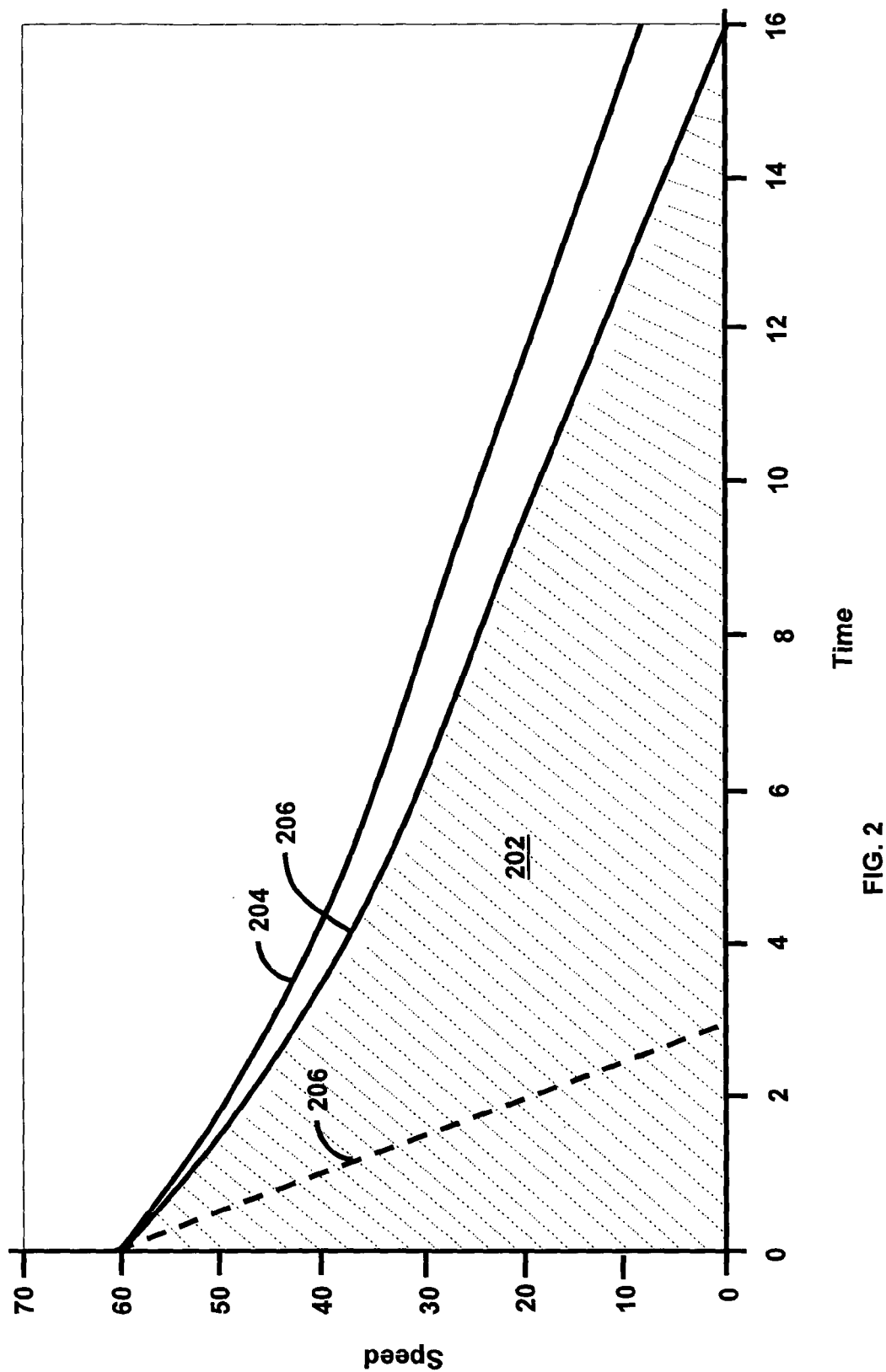
FIG. 2 illustrates a simplified graph of speed of the electric motor plotted against time, in accordance with various embodiments of the present invention.

In an embodiment of the invention, MCM 104 determines the condition of at least one of the wheels 110 of the vehicle, such as locking of at least one of the wheels 110 when brakes are applied, based on rate of change of speed of electric motor 106. MCM 104 which is configured to monitor the speed of the electric motor 106 is capable of calculating the rate of change of speed of the electric motor 106. FIG. 2 illustrates a simplified graph of speed of the electric motor 106 plotted against time, in accordance with various embodiments of the present invention. In FIG. 2. lines 204 and 206 exemplarily define a band of speed of the electric motor 106 when the user provides a braking command. This band of speed is calculated by MCM 104 based on one or more of existing, road load, speed of the vehicle, throttle command by the user, braking command by the user, power flow and direction, and historical data of electric motor 106 and vehicle behavior derived from tests conducted on vehicles and data available through systems which are on board which collect vehicle behavioral data. This band indicates that the vehicle is being decelerated without the wheels 110 of the vehicle being locked. This band indicates the expected electric motor 106 speed, wherein the wheels 110 of the vehicle do not get locked. These expected values can also be preprogrammed in MCM 104, wherein, the expected speed is a preprogrammed empirical value determined by experimental methods. MCM 104 determines the tendency of locking of at least one of the wheels 110 of the vehicle by comparing the actual speed of the electric motor 106 with the expected speed of the electric motor 106. If the actual speed of the electric motor 106 falls in the hatched area 202, then it is an indication that there is a tendency of locking of at least one of the wheels 110. An exemplary speed of electric motor 106 in which there is a tendency of locking of at least one of the wheels 110 is indicated by line 206 which falls in the hatched area 202. In an embodiment of the invention, the expected deceleration of the electric motor 106 is developed based on the vehicle's physical parameters, such as weight of the vehicle and electric motor 106 torque speed characteristics, among other parameters.

In an embodiment of the invention, locking of the wheels 110 is determined by monitoring the speed of at least one of the wheels 110. MSM 104 receives speed at least one of the wheels 110 from sensors provided at one or more wheels of the vehicle. The speed of at least one of the wheels 110 is compared with expected speed of wheels to determine locking of the wheels 110 of the vehicle.

In an embodiment of the invention, locking of the wheels 110 is determined by monitoring speed of transmission 108 which is used to transfer the torque developed by electric motor 106 to the wheels 110. The speed of transmission 108 is compared with expected speed of transmission 108 to determine locking of the wheels 110 of the vehicle.

In an embodiment of the invention, locking of the wheels 110 is determined by monitoring speed of shaft 108 which is used to transfer the torque developed by electric motor 106 to the wheels 110. The speed of shaft 108 is compared with expected speed of shaft 108 to determine locking of the wheels 110 of the vehicle.

In an embodiment of the invention, locking of the wheels 110 is determined by monitoring ground speed of the vehicle. The ground speed of the vehicle is compared with expected ground speed of the vehicle to determine locking of the wheels 110 of the vehicle.

In an embodiment of the invention, locking of the wheels 110 is determined by monitoring the speed of wheels of the vehicle by monitoring speed of at least one of the motor 106, wheels, transmission, shaft and ground speed and comparing the monitored parameters with expected values of the monitored parameters.

Figure 3:
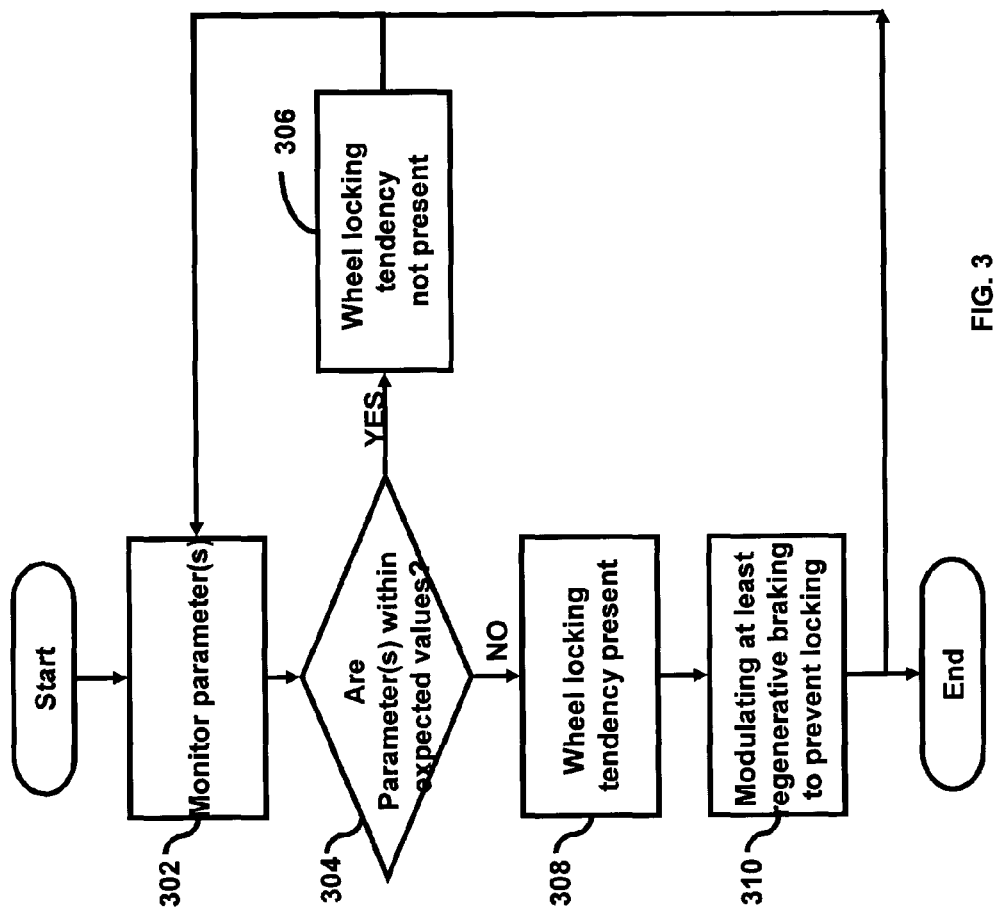
FIG. 3 is a flow chart of a method for enabling antilock braking in a vehicle which is propelled at least by electric motor, in accordance with various embodiments of the present invention.

MCM 104 after determining a tendency of locking of at least one of the wheels 110 of the vehicle, regulates at least regenerative braking of at least one of the wheels 110 to prevent locking of at least one of the wheel 110 of the vehicle. FIG. 3 is a flow chart of a method for enabling antilock braking in a vehicle which is propelled at least by electric motor 106, in accordance with various embodiments of the present invention. At step 302 MCM 104 monitors the speed of at least one of the wheels 110 of the vehicle by monitoring speed of at least one of the motor 106, at least one of the wheels 110, transmission 108, shaft 108 and ground speed. Subsequently, at step 304 MCM 104 compares actual speed of the at least one of the motor 106, at least one of the wheels 110, transmission 108, shaft 108 and ground speed with expected speed of at least one of the motor 106, wheels, transmission, shaft and ground speed. If the actual speed is within the expected speed, then at step 306 MCM 104 determines that the at least one of the wheels 110 of the vehicle do not have a tendency of locking. Thereafter, MCM 104 continues to monitor the rate of change of speed of at least one of the motor 106, at least one of the wheels 110, transmission 108, shaft 108 and ground speed. However, if at step 304, MCM 104 determines that actual speed is not within the expected speed, then at step 308. MCM 104 determines that at least one of the wheels 110 of the vehicle has a tendency of locking. Subsequently, at step 310, MCM 104 modulates at least regenerative braking to prevent locking of at least one of the wheels 110 of the vehicle. In the mean time, MCM 104 continues to monitor the rate of change of speed of at least one of, the motor 106, at least one of the wheels 110, transmission 108, shaft 108 and ground speed, and compares the same with expected values to determine if the tendency of locking still exists or to determine if there is a fresh tendency of locking of at least one of the wheels 110.

Figure 4:
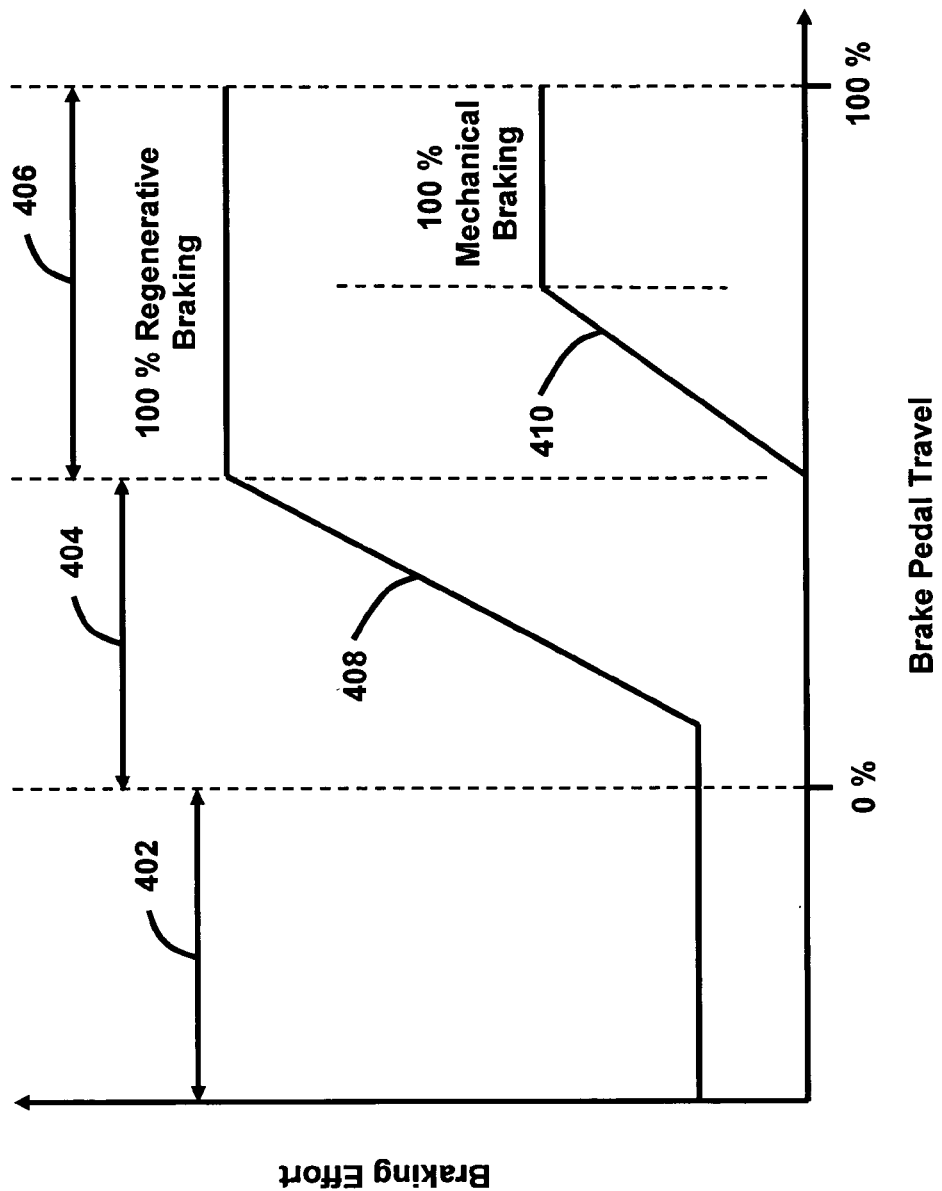
FIG. 4 is a simplistic graph that illustrates the correlation between regenerative braking and braking through mechanical brakes, in accordance with various embodiments of the present invention.

In an embodiment of the invention, MCM 104 modulates regenerative braking in correlation with mechanical or hydraulic brakes present in the vehicle. FIG. 4 is a simplistic graph that illustrates the correlation between regenerative braking and braking through mechanical brakes, in accordance with various embodiments of the present invention. In the graph, the brake pedal travel in percentage is plotted on the X coordinate and braking effort by regenerative braking and mechanical braking is plotted on the Y coordinate. Regenerative braking and mechanical brakes compliment each other to form a complete braking system. The graph illustrates behavior of regenerative braking and mechanical brakes based on a braking demand by the user. The lines 408 and 410 in the graph represent the profile of regenerative braking and mechanical braking according to an embodiment. The zone 402 in the graph represents a condition in which the throttle is released. As soon as the throttle is released, a certain amount of regenerative braking is applied to at least one of the wheels 110 through electric motor 106. Further, as the brake pedal is pressed as indicated by zones 404 and 406, regenerative braking is gradually increased to 100 percent. In an embodiment of the invention, as indicated in the graph, mechanical/hydraulic braking is activated only after regenerative braking is increased to 100%.

In an embodiment of the invention, regenerative braking alone is sufficient to achieve the desired braking effect. However, mechanical brakes would be required in cases of sudden stoppages when the vehicle has to be decelerated in a relatively short period of time to bring the vehicle to a complete halt.

Figure 5:
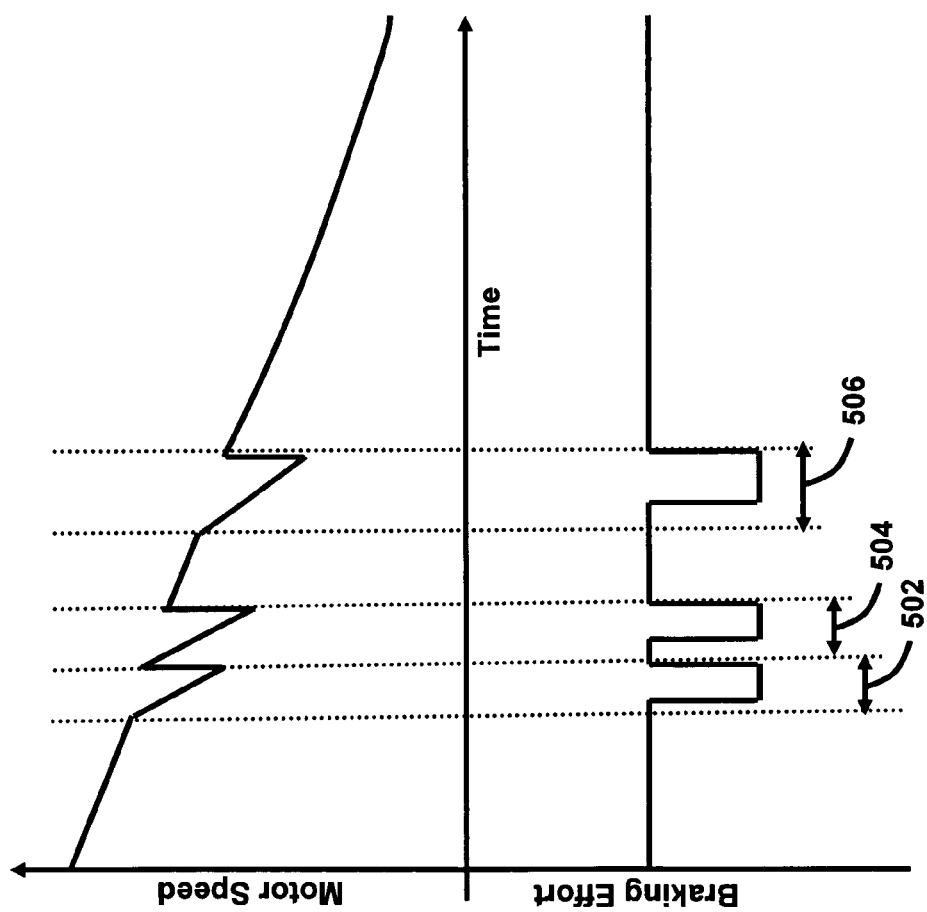
FIG. 5 illustrates modulation of regenerative braking to prevent locking of wheels of the vehicle.

In light of the present invention, a person skilled in the art can derive various correlations between mechanical braking and regenerative braking. Further, different regenerative braking and mechanical braking profiles can also be derived. FIG. 5 illustrates modulation of regenerative braking to prevent locking of wheels of the vehicle. FIG. 5 is a graph in which regenerative braking effort and motor speed are plotted on Y coordinate and time is plotted on X coordinate. In the graph, 502, 504 and 506 are zones in which tendency of locking of at least one of the wheels 110 is identified in a way as explained earlier, and regenerative braking is accordingly modulated to prevent locking of at least one of the wheels 110 of the vehicle. When a tendency of locking of wheels is identified, regenerative effort is reduced so that wheels do not get locked. Later, regenerative braking effort is increased as the tendency of locking of wheels is overcome. MCM 104 continuously monitors various parameters as described earlier to determine tendency of locking of at least one of the wheels 110 and accordingly modulate regenerative braking effort.

The method and system of the present invention can be altered or modified within the scope of the present invention and can be used in vehicles having one or more wheels which comprises at least an electric propulsion system: Vehicles having electric propulsion system include vehicles having hub motors or "in wheel" motors.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A method for enabling antilock braking in a vehicle which is propelled at least by an electric motor, the method comprising:
    obtaining monitored parameters by monitoring a speed of at least one of the motor, transmission, shaft and ground speed;
    detecting a tendency of locking of at least one wheel by comparing an actual speed indicated by said monitored parameters with expected speed indicated by said monitored parameters, wherein the vehicle is being decelerated;
    modulating an output of one or more portions of a regenerative braking system as a function of the tendency of locking of at the least one wheel, wherein said modulation of the regenerative braking force is based on one or more of preprogrammed empirical values, weight of the vehicle and the motor torque speed characteristics, to prevent locking of the at least one wheel of the vehicle; and
    activating at least one of a mechanical brake system and a hydraulic brake system after increasing said regenerative braking force in the at least one wheel to its full potential.

2. The method according to claim 1, wherein the expected speed of the motor is determined based on one or more of weight of the vehicle and motor torque speed characteristics of said vehicle.

3. The method according to claim 1, wherein said speed indicated by one or more of said monitored parameters is determined by one or more of preprogrammed empirical values, weight of the vehicle and the motor torque speed characteristics.

4. The method according to claim 1, wherein the modulating comprises momentarily withdrawing braking force to allow the at least one motor and wheel to rotate when the tendency of locking of the wheels is detected.

5. The method according to claim 1, wherein the step of modulating comprises activating said braking force by one or more of mechanical and hydraulic brakes present in the vehicle, wherein the mechanical and hydraulic brake systems are configured to be coupled with the regenerative braking system.

6. A system for enabling antilock braking in a vehicle which is propelled at least by an electric motor, the system comprising:
    at least one module for obtaining monitored parameters by monitoring a speed of at least one of the motor, transmission, shaft, and ground speed;
    at least one module for detecting a tendency of locking of at least one wheel by comparing actual speed indicated by one or more of said monitored parameters with expected speed indicated by one or more of said monitored parameters, wherein the vehicle is being decelerated;
    at least one module for modulating an output of one or more portions of a regenerative braking force as a function of the tendency of locking of at the least one wheel, wherein said modulation of the regenerative braking force is based on one or more of preprogrammed empirical values, weight of the vehicle and the motor torque speed characteristics, to prevent locking of at least one wheel of the vehicle; and at least one module for activating at least one of a mechanical brake system and a hydraulic brake system after increasing said regenerative braking force in the at least one wheel to its full potential.

7. The system according to claim 6, wherein the at least one module modulates said regenerative braking force by momentarily withdrawing regenerative braking to allow the at least one motor and the at least one wheel to rotate when the tendency of locking of the at least one wheel is detected.

8. The system according to claim 6, wherein the at least one module activates braking by one or more of mechanical and hydraulic brakes present in the vehicle, wherein the mechanical and hydraulic brake systems are configured to be coupled with the regenerative braking system.

9. A method for enabling antilock braking in a vehicle which is propelled at least by an electric motor, the method comprising:

modulating at least regenerative braking force to prevent locking of at least one wheel of the vehicle, wherein said modulation of the regenerative braking force is based on one or more of preprogrammed empirical values, weight of the vehicle, and the motor torque speed characteristics; and activating braking by one or more of mechanical and hydraulic brakes present in the vehicle after increasing regenerative braking force in at least one wheel to its full potential.

* * * * *

UNITED STATES PATENT AND TRADEMARK OFFICE
CERTIFICATE OF CORRECTION

| | | |
|---|---|---|
| PATENT NO. | : 8,612,076 B2 | Page 1 of 1 |
| APPLICATION NO. | : 13/123732 | |
| DATED | : December 17, 2013 | |
| INVENTOR(S) | : Chetan Kumar Maini et al. | |

It is certified that error appears in the above-identified patent and that said Letters Patent is hereby corrected as shown below:

On the title page, item (22) PCT Filed: delete "Oct. 14, 2009" and insert --Oct. 15, 2009--.

Signed and Sealed this
Twenty-fifth Day of February, 2014

Michelle K. Lee
*Deputy Director of the United States Patent and Trademark Office*